(12) United States Patent
Furuta (10) Patent No.: US 12,114,064 B2
(45) Date of Patent: Oct. 8, 2024

(54) IMAGING APPARATUS, POWER CONTROL METHOD, AND POWER CONTROL PROGRAM PRELIMINARY CLASS

(71) Applicant: FUJIFILM Corporation, Tokyo (JP)

(72) Inventor: Yoshinori Furuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 68 days.

(21) Appl. No.: 18/177,007

(22) Filed: Mar. 1, 2023

(65) Prior Publication Data

US 2023/0209184 A1 Jun. 29, 2023

Related U.S. Application Data

(63) Continuation of application No. PCT/JP2021/008084, filed on Mar. 3, 2021.

(30) Foreign Application Priority Data

Sep. 9, 2020 (JP) ................. 2020-151618

(51) Int. Cl.
*H04N 23/65* (2023.01)
*H04N 25/76* (2023.01)
*H04N 25/772* (2023.01)

(52) U.S. Cl.
CPC ......... *H04N 23/651* (2023.01); *H04N 25/772* (2023.01); *H04N 25/7795* (2023.01)

(58) Field of Classification Search
CPC .... H04N 23/651; H04N 23/65; H04N 25/772; H04N 25/7795; H04N 25/709
See application file for complete search history.

(56) References Cited

U.S. PATENT DOCUMENTS 7,129,984 B1 * 10/2006 Okada ................... G03B 15/05
348/240.99
8,749,625 B2 * 6/2014 Hashimoto ......... H04N 25/617
348/65

(Continued)

FOREIGN PATENT DOCUMENTS

JP  2002-165134 A   6/2002
JP  2002-300479 A  10/2002

(Continued)

OTHER PUBLICATIONS

International Search Report issued in PCT/JP2021/008084; mailed Jun. 1, 2021.

(Continued)

*Primary Examiner* — Twyler L Haskins
*Assistant Examiner* — John H Morehead, III
(74) *Attorney, Agent, or Firm* — Studebaker & Brackett PC (57) ABSTRACT

An imaging apparatus includes: an imaging element including a pixel array, a drive circuit of the pixel array, and a signal processing circuit as defined herein; a power supply; a power supply control circuit that controls electric power supplied to the imaging element from the power supply; and a processor, and the processor is configured to control the power supply control circuit to stop the supply of electric power to a part of circuits of the imaging element from the power supply at a first timing after completion of the readout of the signal, to resume the supply of electric power to the part of the circuits at a third timing before a second timing that is a start timing of the readout of the signal from the pixel array performed after the first timing, and to variably control an interval between the second timing and the third timing.

20 Claims, 5 Drawing Sheets

(56) References Cited

U.S. PATENT DOCUMENTS

| | | | |
|---|---|---|---|
| 2002/0144161 A1 | 10/2002 | Takahashi et al. | |
| 2008/0088729 A1* | 4/2008 | Ochi | H04N 23/69 |
| | | | 348/E5.025 |
| 2017/0006224 A1* | 1/2017 | Kim | H04N 25/70 |
| 2020/0077871 A1* | 3/2020 | Ogihara | A61B 1/00059 |
| 2020/0260041 A1 | 8/2020 | Sambonsugi | |

FOREIGN PATENT DOCUMENTS

| | | |
|---|---|---|
| JP | 2019-068247 A | 4/2019 |
| JP | 2020-065146 A | 4/2020 |

OTHER PUBLICATIONS

International Preliminary Report On Patentability and Written Opinion issued in PCT/JP2021/008084; issued Mar. 7, 2023.

* cited by examiner

IMAGING APPARATUS, POWER CONTROL METHOD, AND POWER CONTROL PROGRAM PRELIMINARY CLASS

CROSS REFERENCE TO RELATED APPLICATION

This is a continuation of International Application No. PCT/JP2021/008084 filed on Mar. 3, 2021, and claims priority from Japanese Patent Application No. 2020-151618 filed on Sep. 9, 2020, the entire disclosures of which are incorporated herein by reference.

BACKGROUND OF THE INVENTION

1. Field of the Invention

The present invention relates to an imaging apparatus, a power control method, and a computer readable medium storing a power control program.

2. Description of the Related Art

JP2002-165134A discloses a solid-state imaging device including a plurality of photoelectric conversion elements arranged in a row, a charge transmission register that acquires a charge generated by receiving light using each photoelectric conversion element in synchronization with a synchronization signal and that sequentially transmits the acquired charges in synchronization with a transmission clock, and an output circuit that outputs video signals generated from the charges transmitted by the charge transmission register to an outside with low impedance, in which the charges of the one row of the photoelectric conversion elements are sequentially output from the charge transmission register during a time period other than a blanking time period in each period of the synchronization signal. The solid-state imaging device comprises a switching unit that switches supply of power to the output circuit ON and OFF, and a switching control unit that controls the switching unit by supplying a control signal to the switching unit and that switches the supply of power to the output circuit OFF during the blanking time period.

JP2002-300479A discloses an integrated circuit that is connected to an imaging element and that operates in synchronization with at least one of horizontal scanning or vertical scanning of the imaging element. The integrated circuit comprises a circuit block that performs at least one of supply of a drive signal to the imaging element or processing of an output signal from the imaging element, a switch that selectively blocks an output of the circuit block, and a control unit that sets an operation of the circuit block to a rest state and blocks the switch during at least one of a blanking time period of the horizontal scanning or a blanking time period of the vertical scanning of the imaging element.

JP2020-065146A discloses an imaging apparatus comprising a conversion unit that converts an analog signal read out from each pixel included in an arrangement of a two-dimensional lattice form in a pixel array into a digital signal, and a control unit that controls an operation of the conversion unit. The control unit causes a state of the conversion unit to transition to a standby state where the conversion is not performed, during at least one time period of a horizontal blanking time period based on a horizontal synchronization signal indicating a readout timing of a line in the arrangement or a vertical blanking time period based on a trigger signal indicating a timing at which readout of a pixel of one frame from the pixel array is started.

SUMMARY OF THE INVENTION

An object of the present invention is to provide an imaging apparatus, a power control method, and a computer readable medium storing a power control program that achieve both of a power saving effect and quality improvement of a captured image.

An imaging apparatus according to an aspect of the present invention comprises an imaging element including a pixel array that includes a plurality of pixels which are two-dimensionally arranged, a drive circuit of the pixel array, and a signal processing circuit that processes a signal read out from the pixel array by driving of the drive circuit, a power supply, a power supply control circuit that controls power supplied to the imaging element from the power supply, and a processor, in which the processor is configured to control the power supply control circuit to stop the supply of power to a part of circuits of the imaging element from the power supply at a first timing after completion of the readout of the signal, to resume the supply of power to the part of the circuits at a third timing before a second timing that is a start timing of the readout of the signal from the pixel array performed after the first timing, and to variably control an interval between the second timing and the third timing.

A power control method according to another aspect of the present invention is a power control method for controlling a power supply supplying power to an imaging element including a pixel array that includes a plurality of pixels which are two-dimensionally arranged, a drive circuit of the pixel array, and a signal processing circuit that processes a signal read out from the pixel array by driving of the drive circuit, the power control method comprising stopping the supply of power to a part of circuits of the imaging element from the power supply at a first timing after completion of the readout of the signal, resuming the supply of power to the part of the circuits at a third timing before a second timing that is a start timing of the readout of the signal from the pixel array performed after the first timing, and variably controlling an interval between the second timing and the third timing.

A power control program, which is stored in a computer readable medium, according to still another aspect of the present invention is a power control program for controlling a power supply supplying power to an imaging element including a pixel array that includes a plurality of pixels which are two-dimensionally arranged, a drive circuit of the pixel array, and a signal processing circuit that processes a signal read out from the pixel array by driving of the drive circuit, the power control program causing a processor to execute a step of stopping the supply of power to a part of circuits of the imaging element from the power supply at a first timing after completion of the readout of the signal, resuming the supply of power to the part of the circuits at a third timing before a second timing that is a start timing of the readout of the signal from the pixel array performed after the first timing, and variably controlling an interval between the second timing and the third timing.

According to the present invention, both of a power saving effect and quality improvement of a captured image can be achieved.

DESCRIPTION OF THE PREFERRED EMBODIMENTS

Figure 1:
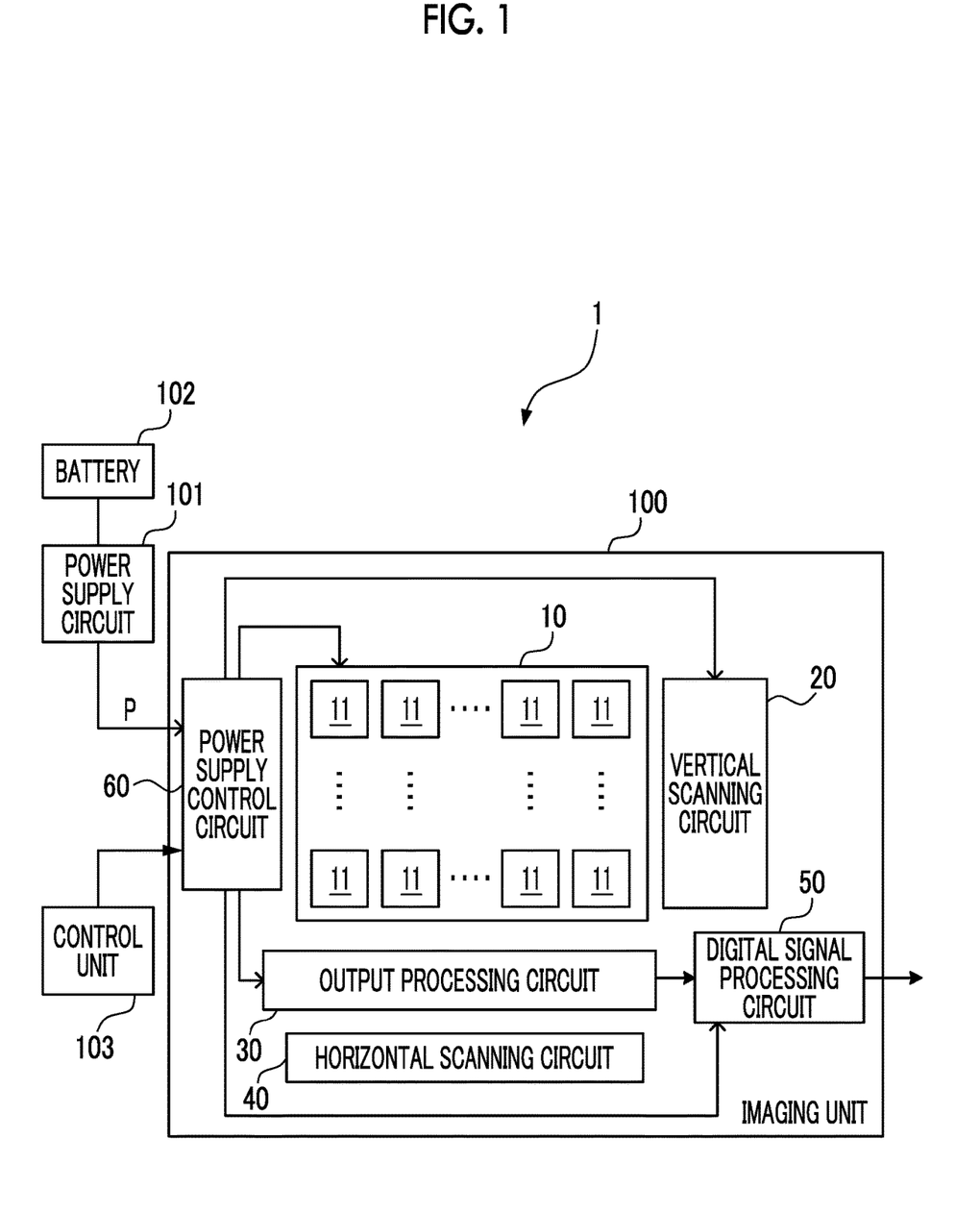
FIG. 1 is a schematic diagram illustrating a schematic configuration of an imaging apparatus 1 that is one embodiment of an imaging apparatus according to the present invention.

FIG. 1 is a schematic diagram illustrating a schematic configuration of an imaging apparatus 1 that is one embodiment of an imaging apparatus according to the present invention. The imaging apparatus 1 is an electronic apparatus such as a digital camera, a digital video camera, a smartphone, a tablet terminal, and a personal computer having an imaging function.

The imaging apparatus 1 comprises an imaging unit 100 constituting an imaging element, a power supply circuit 101 constituting a power supply, a battery 102 configured with a secondary battery, a dry battery, or the like, and a control unit 103.

The power supply circuit 101 generates power P to be supplied to the imaging unit 100 based on power supplied from the battery 102. For example, the power supply circuit 101 is configured with a linear regulator or a switching regulator. The power supply circuit 101 may receive power from a low drop out (LDO) regulator that steps down a voltage supplied from the battery 102, and generate the power P based on the power.

The imaging unit 100 includes a light receiving section 10 including a plurality of pixels 11 that are two-dimensionally arranged, a vertical scanning circuit 20 that performs vertical scanning of the light receiving section 10, an output processing circuit 30, a horizontal scanning circuit 40 that performs horizontal scanning of the output processing circuit 30, a digital signal processing circuit 50, and a power supply control circuit 60. The vertical scanning circuit 20, the output processing circuit 30, the horizontal scanning circuit 40, the digital signal processing circuit 50, and the power supply control circuit 60 are controlled by the control unit 103.

The light receiving section 10, the vertical scanning circuit 20, the output processing circuit 30, and the horizontal scanning circuit 40 constitute a complementary metal oxide semiconductor (CMOS) image sensor. A pixel array is configured with the light receiving section 10 and the output processing circuit 30. A drive circuit of the pixel array is configured with the vertical scanning circuit 20 and the horizontal scanning circuit 40. The digital signal processing circuit 50 constitutes a signal processing circuit.

The pixels 11 of the light receiving section 10 include photoelectric conversion elements such as photodiodes, and readout circuits that read out signals corresponding to charges converted from light by the photoelectric conversion elements.

The vertical scanning circuit 20 drives each readout circuit of the light receiving section 10 to sequentially read out signals from the light receiving section 10 in units of pixel rows, and transmits a read-out signal group of the pixel rows to the output processing circuit 30.

The output processing circuit 30 performs correlative double sampling processing and digital conversion processing on the analog signals read out from the readout circuit of each pixel 11 of the pixel rows. While a configuration in which an analog-digital (AD) converter that converts an analog signal into a digital signal is provided in the output processing circuit 30 is illustrated in the example in FIG. 1, a configuration in which the AD converter is disposed in each pixel 11 is also possible. In this case, the output processing circuit 30 is configured to hold the digital signals read out from the pixel rows.

The horizontal scanning circuit 40 performs the horizontal scanning of sequentially outputting the signal of each pixel 11 of the pixel rows processed or held by the output processing circuit 30. The signals output from the output processing circuit 30 are input into the digital signal processing circuit 50.

The digital signal processing circuit 50 is a circuit that processes the signals input from the output processing circuit 30. The digital signal processing circuit 50 performs various types of image processing such as demosaicing processing, brightness correction processing, gamma-correction processing, and gradation correction processing. For example, the digital signal processing circuit 50 is configured with a processor such as an application specific integrated circuit (ASIC) that has a circuit configuration dedicatedly designed to execute specific processing.

The power supply control circuit 60 controls the power supplied to the imaging unit 100 from the power supply circuit 101. The power supply control circuit 60 supplies the power P received from the power supply circuit 101 to each of the light receiving section 10, the vertical scanning circuit 20, the output processing circuit 30, the horizontal scanning circuit 40, and the digital signal processing circuit 50. The power supply control circuit 60 performs a power saving control of temporarily stopping the supply of power to the digital signal processing circuit 50 during an operation of the imaging unit 100 in accordance with an instruction from the control unit 103.

The control unit 103 comprises a processing unit that performs various types of processing, and a memory including a random access memory (RAM) and a read only memory (ROM). A hardware structure of the processing unit corresponds to the following various processors. The various processors include a central processing unit (CPU) that is a general-purpose processor performing various types of processing by executing software (program), a programmable logic device (PLD) such as a field programmable gate array (FPGA) that is a processor having a circuit configuration changeable after manufacturing, a dedicated electric circuit such as an ASIC that is a processor having a circuit configuration dedicatedly designed to execute specific processing, or the like.

The processing unit of the control unit 103 may be configured with one of the various processors or may be configured with a combination of two or more processors of the same type or different types (for example, a plurality of FPGAs or a combination of a CPU and an FPGA). In addition, a plurality of processing units included in the control unit 103 may be configured with one processor. As an example in which the plurality of processing units are configured with one processor, first, as represented by a computer such as a client or a server, a form of configuring one processor with a combination of one or more CPUs and software and causing the processor to function as the plurality of processing units is possible. Second, as represented by a system on chip (SoC) or the like, a form of using a processor that implements functions of the entire system including the plurality of processing units in one integrated circuit (IC) chip is possible. Accordingly, the processing unit of the control unit 103 is configured using one or more of the various processors as a hardware structure. Furthermore, the hardware structures of the various processors are more specifically electric circuits (circuitry) in which circuit elements such as semiconductor elements are combined.

As an example, the imaging unit 100 has a configuration of one chip in which the light receiving section 10, the vertical scanning circuit 20, the output processing circuit 30, the horizontal scanning circuit 40, the digital signal processing circuit 50, and the power supply control circuit 60 are integrated. As another example, one or both of the power supply control circuit 60 and the digital signal processing circuit 50 in the imaging unit 100 may be disposed in a separate chip.

In the imaging unit 100, the power saving control of not operating a specific circuit is performed. After the specific circuit is stopped, in a case of restoring an operation of the circuit, it is necessary to quickly resume the supply of power to the circuit considering a time lag from the supply of power to the circuit to a stable operation of the circuit. However, in a case where the quick resumption of the supply of power is performed at all times, a power saving effect is reduced. Therefore, the power saving effect can be increased by the following imaging operation in the imaging apparatus 1.

Figure 2:
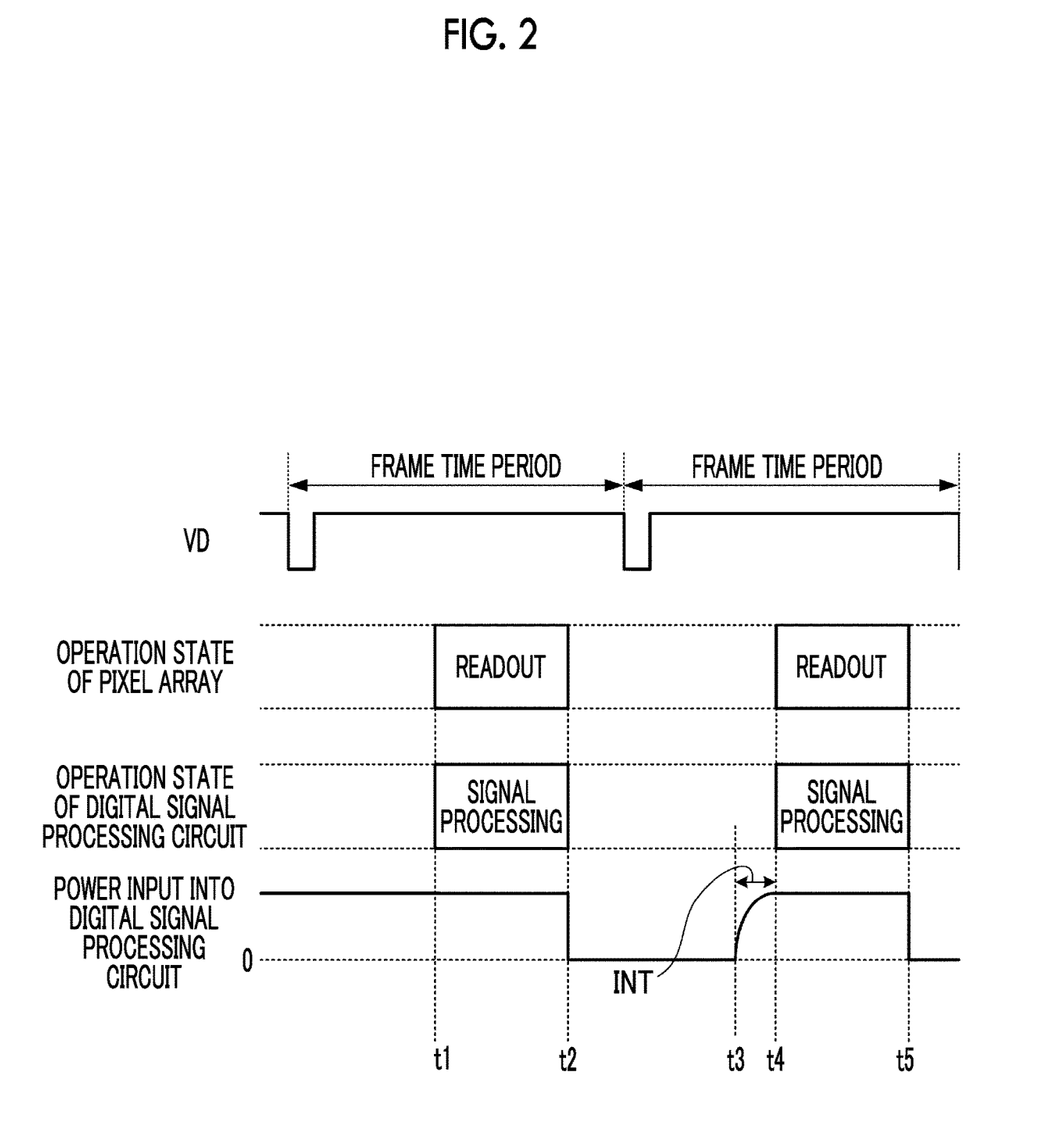
FIG. 2 is a timing chart for describing an imaging operation of the imaging apparatus 1 illustrated in FIG. 1.

FIG. 2 is a timing chart for describing the imaging operation of the imaging apparatus 1 illustrated in FIG. 1. A time period from a falling edge of a vertical synchronization signal VD to the subsequent falling edge of the vertical synchronization signal VD in the drawing is a frame time period in which a captured image is acquired by imaging a subject. The operation illustrated in FIG. 2 is implemented by causing the processor of the control unit 103 to execute a power control program stored in the ROM.

In a case where the initial frame time period after the imaging unit 100 is started is started, and a time point t1 that is a timing at which exposure of the light receiving section 10 is finished is reached, the control unit 103 controls the vertical scanning circuit 20 and the horizontal scanning circuit 40 to start reading out the signals from the light receiving section 10. The signals read out from the light receiving section 10 are processed by the output processing circuit 30 and then, are processed by the digital signal processing circuit 50. In a case where a time point t2 at which the readout of the signals from all pixels 11 as a target from which the signals are read out is completed is reached, the control unit 103 controls the power supply control circuit 60 to stop the supply of power to the digital signal processing circuit 50.

After the time point t2, in a case where the subsequent frame time period is started, and a time point t3 shortly before a time point t4 that is a timing at which the readout of the signals from the light receiving section 10 is started is reached, the control unit 103 controls the power supply control circuit 60 to resume the supply of power to the digital signal processing circuit 50. In a case where the time point t4 after the resumption of the supply of power is reached, the control unit 103 controls the vertical scanning circuit 20 and the horizontal scanning circuit 40 to start reading out the signals from the light receiving section 10. In a case where a time point t5 at which the readout of the signals from all pixels 11 as a target from which the signals are read out is completed is reached, the control unit 103 controls the power supply control circuit 60 to stop the supply of power to the digital signal processing circuit 50.

In the subsequent frame time periods, the same operation as the second frame time period is performed.

Accordingly, the control unit 103 stops the supply of power to the digital signal processing circuit 50 from the power supply circuit 101 at a first timing (time point t2) after completion of the readout of the signals from the pixel array configured with the light receiving section 10 and the output processing circuit 30, and resumes the supply of power to the digital signal processing circuit 50 at a third timing (time point t3) shortly before a second timing (time point t4) that is a start timing of the readout of the signals from the pixel array performed after the first timing.

As illustrated in FIG. 2, a predetermined time is required from the time point t3 at which the supply of power to the digital signal processing circuit 50 is resumed, to a state where desired power is supplied to the digital signal processing circuit 50. The predetermined time will be referred to as a power supply rising edge time. In order for the digital signal processing circuit 50 to be capable of starting signal processing in a state where the desired power is supplied to the digital signal processing circuit 50, an interval INT illustrated in FIG. 2 needs to be greater than or equal to the power supply rising edge time.

In addition, in a case of resuming the supply of power to the digital signal processing circuit 50 at the time point t3 immediately before the time point t4, the power supplied to circuits (the light receiving section 10, the vertical scanning circuit 20, the output processing circuit 30, and the horizontal scanning circuit 40) other than the digital signal processing circuit 50 in the imaging unit 100 may be slightly decreased during a period to the supply of the desired power to the digital signal processing circuit 50. In a case where the readout of the signals from the light receiving section 10 is started in a state where such a decrease in power occurs, there is a possibility that signal levels of the read-out signals are decreased, and that shading that is a decrease in brightness in a part of the captured image occurs. Even from a viewpoint of suppressing the shading, it is preferable that the interval INT illustrated in FIG. 2 is greater than or equal to the power supply rising edge time.

The power supply rising edge time is not constant at all times. For example, the power supply rising edge time is shortened in a state where a current consumption (power consumption) of the imaging unit 100 is small. In addition, the power supply rising edge time is shortened in a state where a voltage supplied to the imaging unit 100 from the power supply circuit 101 is high. In addition, the power supply rising edge time is shortened in a state where electrostatic capacitance of the power supply circuit 101 is low. In addition, the power supply rising edge time is shortened in a state where a voltage (a supply voltage from the battery 102 or a supply voltage from the LDO regulator) input into the power supply circuit 101 is high.

Therefore, the control unit 103 variably controls the interval INT between the time point t3 and the time point t4 instead of setting the interval INT as a fixed value. Specifically, the control unit 103 controls the interval INT based on any of the current consumption of the imaging unit 100, the voltage supplied to the imaging unit 100 from the power supply circuit 101, the electrostatic capacitance of the power supply circuit 101, and the voltage input into the power supply circuit 101.

For example, the control unit 103 sets the interval INT to a predetermined value in a case where the current consumption of the imaging unit 100 is greater than or equal to a threshold value, and sets the interval INT to a value smaller than the predetermined value in a case where the current consumption is less than the threshold value. The control unit 103 may shorten the interval INT as the current consumption is decreased. A predetermined value X is the maximum value of the power supply rising edge time assumed in the system.

For example, the control unit 103 sets the interval INT to the predetermined value X in a case where the voltage supplied to the imaging unit 100 from the power supply circuit 101 is less than a threshold value, and sets the interval INT to a value smaller than the predetermined value X in a case where the voltage is greater than or equal to the threshold value. The control unit 103 may shorten the interval INT as the voltage is increased.

For example, the control unit 103 sets the interval INT to the predetermined value X in a case where the electrostatic capacitance of the power supply circuit 101 is greater than or equal to a threshold value, and sets the interval INT to a value smaller than the predetermined value X in a case where the electrostatic capacitance is less than the threshold value. The control unit 103 may shorten the interval INT as the electrostatic capacitance is decreased.

For example, the control unit 103 sets the interval INT to the predetermined value X in a case where the voltage input into the power supply circuit 101 is less than a threshold value, and sets the interval INT to a value smaller than the predetermined value X in a case where the voltage is greater than or equal to the threshold value. The control unit 103 may shorten the interval INT as the voltage is increased.

By variably controlling the interval INT, the interval between the time point t2 and the time point t3 illustrated in FIG. 2 can be extended depending on a situation, compared to a case where the interval INT is set as a fixed value (the predetermined value X). Thus, the power consumption can be reduced. In addition, even in a case where the interval is extended, the digital signal processing circuit 50 can start the signal processing in a state where the desired power is supplied. Thus, power saving can be achieved without decreasing quality of the captured image. In addition, since the readout of the signals from the pixel array can be started in a state where the desired power is supplied to the digital signal processing circuit 50, the occurrence of the shading can be prevented.

Even in a case where the readout of the signals from the pixel array is started at a point in time before the power supply rising edge time elapses from the time point t3, a degree of the shading can be decreased depending on a situation, and the quality of the captured image can be ensured.

For example, a case where the signal levels of the signals read out in the initial frame time period in FIG. 2, that is, brightness of the captured image immediately previously obtained by imaging the subject, are high is assumed. In this case, an effect of the shading on image quality is decreased. Thus, in this case, a time period in which the digital signal processing circuit 50 is stopped can be extended by starting reading out the signals from the pixel array at a point in time before the power supply rising edge time elapses from the time point t3, and power saving can be implemented. Specifically, the control unit 103 may set the interval INT to the predetermined value X in a case where the signal levels of the signals read out at the time point t2 (for example, an average value of the signal levels of all read-out signals or an average value of the signal levels of several initial pixel rows read out near the time point t1) are less than a threshold value, and set the interval INT to a value smaller than the predetermined value X in a case where the signal levels are greater than or equal to the threshold value.

In the same idea as the above, even in a case where an amplification ratio (an amplification ratio of the AD converter included in the output processing circuit 30 or the pixels 11) of the signals in the pixel array is high, the effect of the shading on the image quality is decreased. Therefore, the control unit 103 may set the interval INT to the predetermined value X in a case where the amplification ratio of the signals in the pixel array is less than a threshold value, and set the interval INT to a value smaller than the predetermined value X in a case where the amplification ratio is greater than or equal to the threshold value.

In addition, even in a case where an amplification ratio (an amplification ratio used for the brightness correction processing and the like) of the signals in the digital signal processing circuit 50 is high, the effect of the shading on the image quality is decreased. Therefore, the control unit 103 may set the interval INT to the predetermined value X in a case where the amplification ratio of the signals in the digital signal processing circuit 50 is less than a threshold value, and set the interval INT to a value smaller than the predetermined value X in a case where the amplification ratio is greater than or equal to the threshold value.

Figure 3:
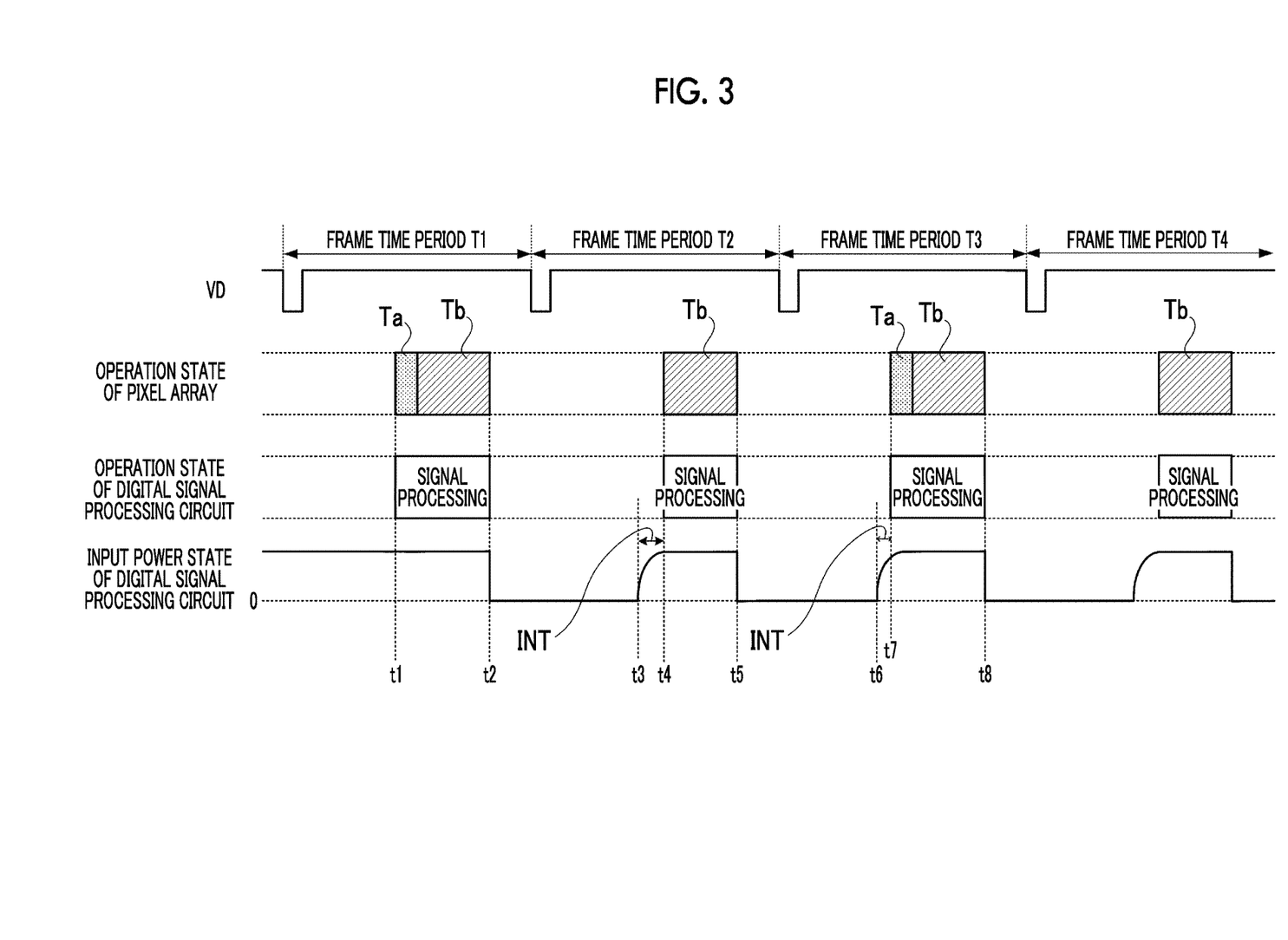
FIG. 3 is a timing chart for describing another example of the imaging operation of the imaging apparatus 1 illustrated in FIG. 1.

FIG. 3 is a timing chart for describing another example of the imaging operation of the imaging apparatus 1 illustrated in FIG. 1. A time period from a falling edge of a vertical synchronization signal VD to the subsequent falling edge of the vertical synchronization signal VD in the drawing is a frame time period in which a captured image is acquired by imaging a subject. The operation in FIG. 3 is based on an assumption of a configuration in which a pixel 11A for phase difference detection used for focal point adjustment and the like and a pixel 11B for imaging are included in the light receiving section 10 of the imaging unit 100. A time period Ta in FIG. 3 denotes a time period in which a signal is read out from the pixel 11A. A time period Tb in FIG. 3 denotes a time period in which a signal is read out from the pixel 11B.

In the operation in FIG. 3, the control unit 103 alternately repeats a frame time period in which the signals are read out from the pixel 11A and the pixel 11B, and a frame time period in which the signal is read out from only the pixel 11B. That is, power saving is achieved by not reading out the signal from the pixel 11A in every frame time period. The operation illustrated in FIG. 3 is implemented by causing the processor of the control unit 103 to execute the power control program stored in the ROM.

In a case where an initial frame time period T1 after the imaging unit 100 is started is started, and the time point t1 that is a timing at which the exposure of the light receiving section 10 is finished is reached, the control unit 103 controls the vertical scanning circuit 20 and the horizontal scanning circuit 40 to start reading out the signal from the pixel 11A of the light receiving section 10. The signal read out from the pixel 11A is processed by the output processing circuit 30 and then, is processed by the digital signal processing circuit 50. Then, the control unit 103 controls the vertical scanning circuit 20 and the horizontal scanning circuit 40 to start reading out the signal from the pixel 11B of the light receiving section 10. The signal read out from the pixel 11B is processed by the output processing circuit 30 and then, is processed by the digital signal processing circuit 50. In a case where the time point t2 at which the readout of the signal from the pixel 11B is completed is reached, the control unit 103 controls the power supply control circuit 60 to stop the supply of power to the digital signal processing circuit 50.

After the time point t2, in a case where a subsequent frame time period T2 is started, and the time point t3 shortly before the time point t4 that is a timing at which the readout of the signals from the light receiving section 10 is started is reached, the control unit 103 controls the power supply control circuit 60 to resume the supply of power to the digital signal processing circuit 50. In a case where the time point t4 after the resumption of the supply of power is reached, the control unit 103 controls the vertical scanning circuit 20 and the horizontal scanning circuit 40 to start reading out the signal from the pixel 11B of the light receiving section 10. In a case where the time point t5 at which the readout of the signals from all pixels 11B as a target from which the signals are read out is completed is reached, the control unit 103 controls the power supply control circuit 60 to stop the supply of power to the digital signal processing circuit 50.

After the time point t5, in a case where a subsequent frame time period T3 is started, and a time point t6 shortly before a time point t7 that is a timing at which the readout of the signals from the light receiving section 10 is started is reached, the control unit 103 controls the power supply control circuit 60 to resume the supply of power to the digital signal processing circuit 50. In a case where the time point t7 after the resumption of the supply of power is reached, the control unit 103 controls the vertical scanning circuit 20 and the horizontal scanning circuit 40 to start reading out the signal from the pixel 11A of the light receiving section 10. In a case where the readout of the signal from the pixel 11A is finished, the control unit 103 controls the vertical scanning circuit 20 and the horizontal scanning circuit 40 to start reading out the signal from the pixel 11B of the light receiving section 10. In a case where a time point t8 at which the readout of the signals from all pixels 11 as a target from which the signals are read out is completed is reached, the control unit 103 controls the power supply control circuit 60 to stop the supply of power to the digital signal processing circuit 50. Then, the same operation as the frame time period T2 and the same operation as the frame time period T3 are alternately repeated.

The control unit 103 sets the interval INT between the time point t3 and the time point t4 to the predetermined value X and sets the interval INT between the time point t6 and the time point t7 to a value smaller than the predetermined value X. Accordingly, in the operation example in FIG. 3, the control unit 103 changes driving of the pixel array for each frame time period and variably controls the interval INT in accordance with the driving.

In a case of reading out the signal from only the pixel 11B for imaging as in the frame time period T2, it is preferable to set the interval INT to the predetermined value X in order to increase the quality of the captured image obtained by imaging the subject using the pixel 11B. On the other hand, in a case of reading out the signal from the pixel 11A for phase difference detection first as in the frame time period T3, the quality of the captured image captured using the pixel 11B is not affected even in a case where the shading occurs in the image captured using the pixel 11A. Thus, in the frame time period T3, an interval between the time point t5 and the time point t6 can be extended by setting the interval INT to be short, compared to a case where the interval INT is fixed at the predetermined value X. Consequently, further power saving can be achieved.

The operation in FIG. 3 is based on an assumption that the pixel 11A for phase difference detection is included in the light receiving section 10. However, even with the configuration of the light receiving section 10 in FIG. 1, first driving of reading out the signal from any region in the light receiving section 10 and then, reading out the signal from the remaining region of the light receiving section 10 and second driving of reading out the signals from all regions of the light receiving section 10 can be performed in a switched manner for each frame time period. In a case of performing this driving, power saving can be achieved by setting the interval INT in a frame time period in which the second driving is performed to the predetermined value X and by setting the interval INT in a frame time period in which the first driving is performed to be shorter than the predetermined value X.

An example in which a circuit as a target to which the supply of power is to be stopped for power saving is the digital signal processing circuit 50 has been described so far. However, in the imaging unit 100, for example, the supply of power to one or both of the output processing circuit 30 and the horizontal scanning circuit 40 may be further stopped. Alternatively, the supply of power to one or both of the output processing circuit 30 and the horizontal scanning circuit 40 may be stopped instead of stopping the supply of power to the digital signal processing circuit 50.

Next, a configuration of a smartphone will be described as an embodiment of the imaging apparatus according to the present invention.

Figure 4:
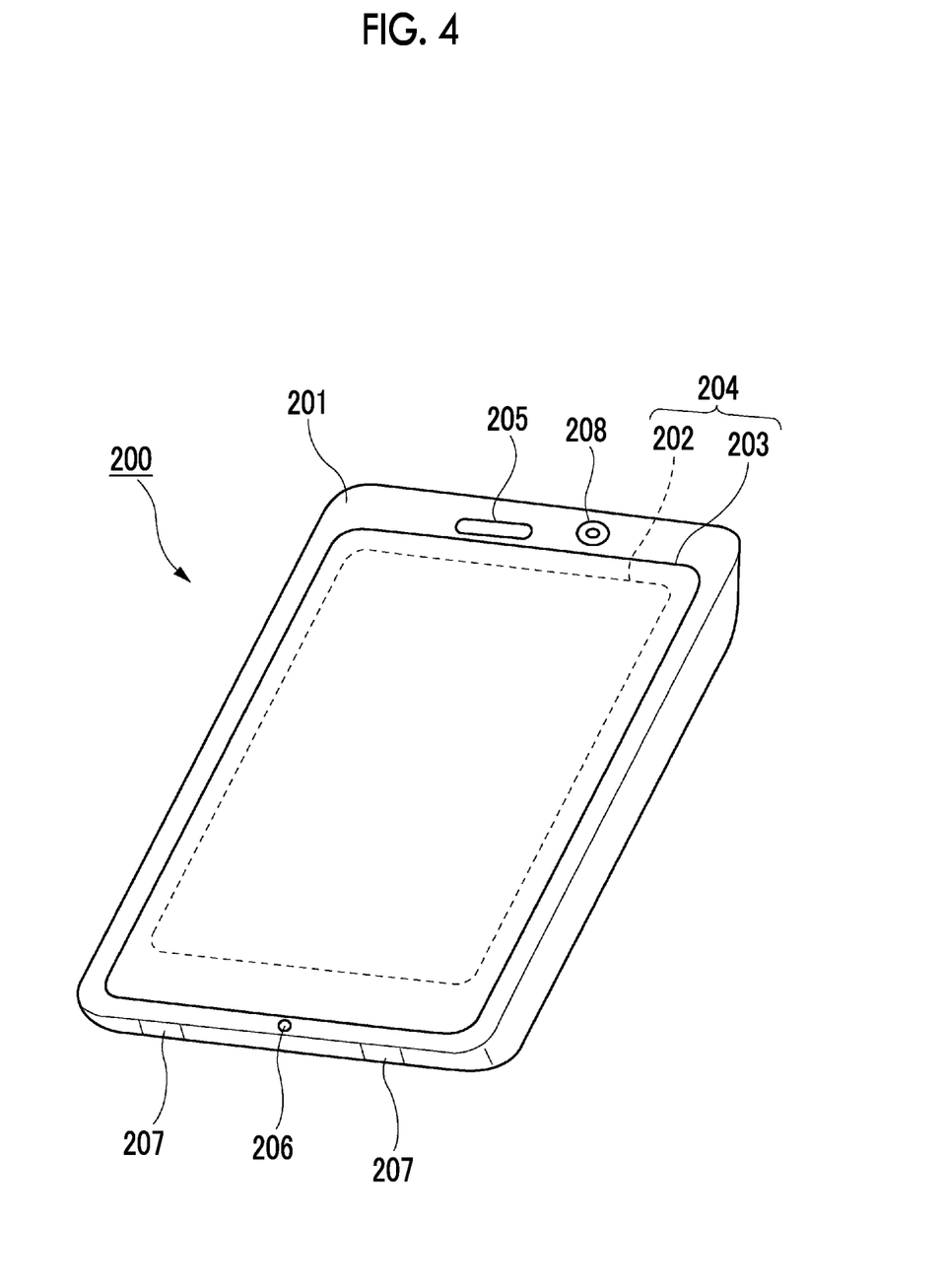
FIG. 4 illustrates an exterior of a smartphone 200 that is one embodiment of the imaging apparatus according to the present invention.

FIG. 4 illustrates an exterior of a smartphone 200 that is one embodiment of the imaging apparatus according to the present invention.

The smartphone 200 illustrated in FIG. 4 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 5:
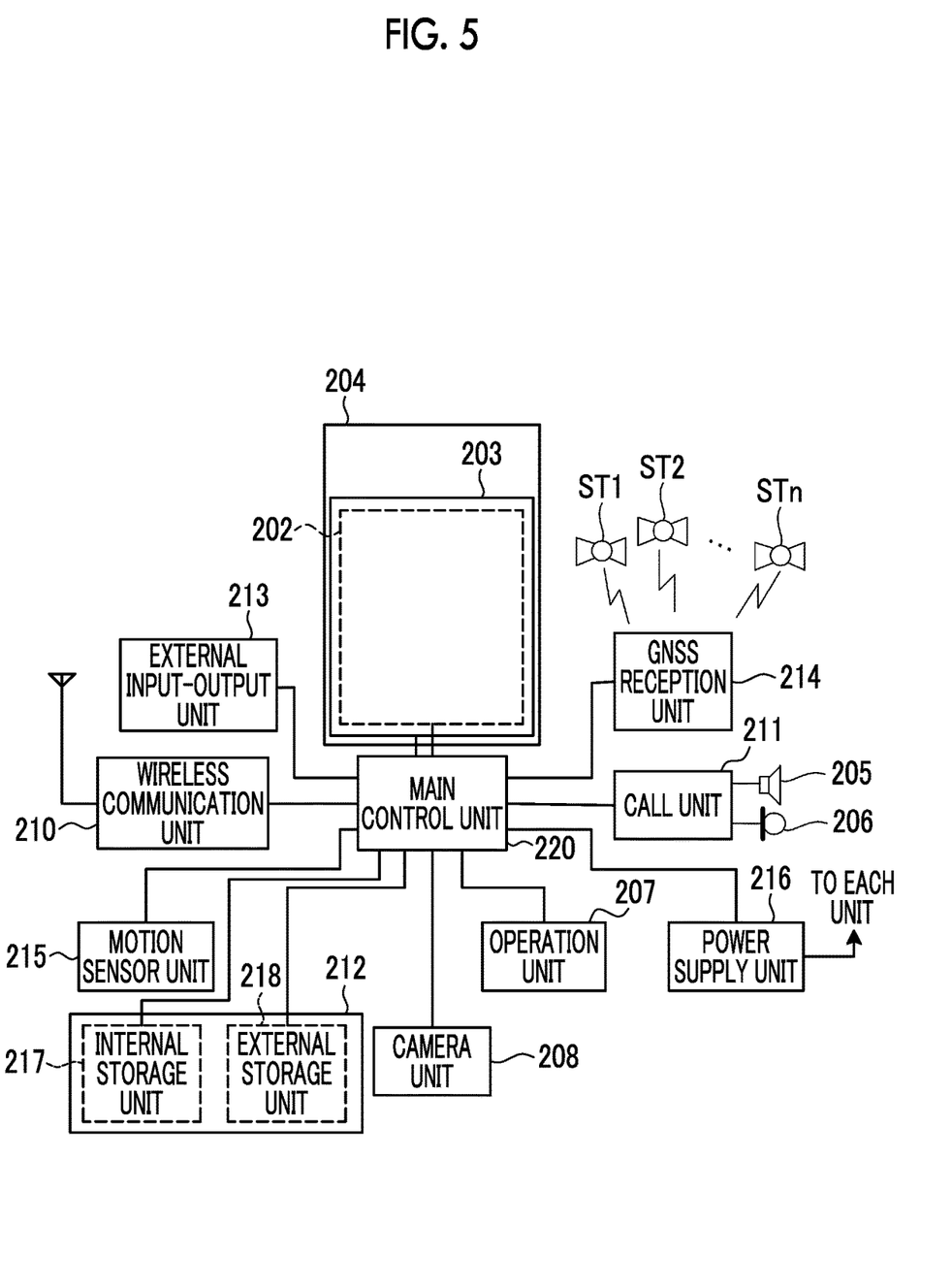
FIG. 5 is a block diagram illustrating a configuration of the smartphone 200 illustrated in FIG. 4.

FIG. 5 is a block diagram illustrating a configuration of the smartphone 200 illustrated in FIG. 4.

As illustrated in FIG. 5, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and that detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on a display surface of the display panel 202 can be visually recognized, and that detects one or a plurality of coordinates operated with a finger of the user or a stylus. In a case where the device is operated with the finger of the user or the stylus, a detection signal generated by the operation is output to the main control unit 220. Next, the main control unit 220 detects an operation position (coordinates) on the display panel 202 based on the received detection signal.

As illustrated in FIG. 5, while the display panel 202 and the operation panel 203 of the smartphone 200 illustrated as one embodiment of the imaging apparatus according to the present invention are integrated to constitute the display and input unit 204, the operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge portion, other than the overlapping part, that does not overlap with the display panel 202.

A size of the display region and a size of the display panel 202 may completely match, but both sizes do not need to match. In addition, the operation panel 203 may comprise two sensitive regions of the outer edge portion and an inner part other than the outer edge portion. Furthermore, a width of the outer edge portion is appropriately designed depending on a size and the like of the casing 201.

Furthermore, as a position detection method employed in the operation panel 203, a matrix switch method, a resistive membrane method, a surface acoustic wave method, an infrared method, an electromagnetic induction method, a capacitance method, and the like are exemplified, and any of the methods can be employed.

The call unit 211 comprises the speaker 205 or the microphone 206, and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 4, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 4, the operation unit 207 is a push-button type switch that is mounted on a side surface of the casing 201 of the smartphone 200 and that is set to an ON state in a case where the switch is pressed by the finger or the like, and set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 functions as an interface with all external apparatuses connected to the smartphone 200 and is directly or indirectly connected to other external apparatuses by communication (for example, a universal serial bus (USB), IEEE 1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation processing based on the received plurality of GNSS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or acceleration of the smartphone 200 is detected. A detection result is output to the main control unit 220.

The power supply unit 216 supplies power stored in a battery (not illustrated) to each unit of the smartphone 200 in accordance with an instruction from the main control unit 220. The power supply unit 216 includes the power supply circuit 101 and the battery 102 in FIG. 1.

The main control unit 220 comprises a microprocessor, operates in accordance with the control program and the control data stored in the storage unit 212, and manages and controls each unit of the smartphone 200. In addition, the main control unit 220 has a mobile communication control function for controlling each unit of a communication system and an application processing function for performing voice communication or data communication through the wireless communication unit 210. The main control unit 220 corresponds to the control unit 103 in FIG. 1.

The application processing function is implemented by operating the main control unit 220 in accordance with the application software stored in the storage unit 212. For example, the application processing function is an infrared communication function of performing data communication with counter equipment by controlling the external input-output unit 213, an electronic mail function of transmitting and receiving electronic mails, or a web browsing function of browsing a web page.

In addition, the main control unit 220 has an image processing function such as displaying an image on the display and input unit 204 based on image data (data of a still image or a motion image) such as reception data or downloaded streaming data.

The image processing function refers to a function of causing the main control unit 220 to decode the image data, perform image processing on the decoding result, and display the image on the display and input unit 204.

Furthermore, the main control unit 220 executes a display control for the display panel 202 and an operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation performed through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 is provided with a touch panel control function of determining whether the operation position on the operation panel 203 is in the overlapping part (display region) overlapping with the display panel 202 or the other outer edge portion (non-display region) not overlapping with the display panel 202 and controlling the sensitive region of the operation panel 203 or a display position of the software key.

In addition, the main control unit 220 can detect a gesture operation with respect to the operation panel 203 and execute a function set in advance depending on the detected gesture operation.

The gesture operation is not a simple touch operation in the related art and means an operation of drawing a path with the finger or the like, designating a plurality of positions at the same time, or by combining the drawing with the designating, drawing a path for at least one of the plurality of positions.

The camera unit 208 includes the imaging unit 100 illustrated in FIG. 1.

Captured image data generated by the camera unit 208 can be stored in the storage unit 212 or be output through the external input-output unit 213 or the wireless communication unit 210.

In the smartphone 200 illustrated in FIG. 4, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in detecting the position by the GNSS reception unit 214, the position can be detected by referring to the image from the camera unit 208. Furthermore, by referring to the image from the camera unit 208, an optical axis direction of the camera unit 208 of the smartphone 200 can be determined, or the current use environment can be determined without using the three-axis acceleration sensor or by using the three-axis acceleration sensor together. The image from the camera unit 208 can also be used in the application software.

Besides, image data of a still image or a motion image to which the positional information acquired by the GNSS reception unit 214, voice information (may be text information acquired by performing voice to text conversion by the main control unit or the like) acquired by the microphone 206, posture information acquired by the motion sensor unit 215, or the like is added can be stored in the storage unit 212 or be output through the external input-output unit 213 or the wireless communication unit 210.

Even in the smartphone 200 having the above configuration, both of power saving and improvement of the captured image quality can be achieved.

As described above, the following matters are disclosed in the present specification.

(1) An imaging apparatus comprising an imaging element including a pixel array that includes a plurality of pixels which are two-dimensionally arranged, a drive circuit of the pixel array, and a signal processing circuit that processes a signal read out from the pixel array by driving of the drive circuit, a power supply, a power supply control circuit that controls power supplied to the imaging element from the power supply, and a processor, in which the processor is configured to control the power supply control circuit to stop the supply of power to a part of circuits of the imaging element from the power supply at a first timing after completion of the readout of the signal, to resume the supply of power to the part of the circuits at a third timing before a second timing that is a start timing of the readout of the signal from the pixel array performed after the first timing, and to variably control an interval between the second timing and the third timing.

(2) The imaging apparatus according to (1), in which the processor is configured to stop the supply of power to at least the signal processing circuit at the first timing.

(3) The imaging apparatus according to (1) or (2), in which the drive circuit is capable of changing driving in units of frames, and the processor is configured to control the interval in accordance with the driving of the drive circuit.

(4) The imaging apparatus according to (1) or (2), in which the processor is configured to control the interval in accordance with an amplification ratio of the signal in the imaging element.

(5) The imaging apparatus according to (4), in which the pixel array includes a converter that converts the signal which is an analog signal and output from the pixel into a digital signal, and the amplification ratio includes an amplification ratio of the converter.

(6) The imaging apparatus according to (4) or (5), in which the amplification ratio includes an amplification ratio of the signal in the signal processing circuit.

(7) The imaging apparatus according to (1) or (2), in which the processor is configured to control the interval in accordance with a signal level of the signal read out at the first timing.

(8) The imaging apparatus according to (1) or (2), in which the processor is configured to control the interval in accordance with a current consumption of the imaging element.

(9) The imaging apparatus according to (1) or (2), in which the processor is configured to control the interval in accordance with a voltage input into the imaging element from the power supply.

(10) The imaging apparatus according to (1) or (2), in which the processor is configured to control the interval in accordance with electrostatic capacitance included in the power supply.

(11) The imaging apparatus according to (1) or (2), in which the processor is configured to control the interval in accordance with a voltage supplied to the power supply.

(12) A power control method for controlling a power supply supplying power to an imaging element including a pixel array that includes a plurality of pixels which are two-dimensionally arranged, a drive circuit of the pixel array, and a signal processing circuit that processes a signal read out from the pixel array by driving of the drive circuit, the power control method comprising stopping the supply of power to a part of circuits of the imaging element from the power supply at a first timing after completion of the readout of the signal, resuming the supply of power to the part of the circuits at a third timing before a second timing that is a start timing of the readout of the signal from the pixel array performed after the first timing, and variably controlling an interval between the second timing and the third timing.

(13) The power control method according to (12), in which the supply of power to at least the signal processing circuit is stopped at the first timing.

(14) The power control method according to (12) or (13), in which the drive circuit is capable of changing driving in units of frames, and the interval is controlled in accordance with the driving of the drive circuit.

(15) The power control method according to (12) or (13), in which the interval is controlled in accordance with an amplification ratio of the signal in the imaging element.

(16) The power control method according to (15), in which the pixel array includes a converter that converts the signal which is an analog signal and output from the pixel into a digital signal, and the amplification ratio includes an amplification ratio of the converter.

(17) The power control method according to (15) or (16), in which the amplification ratio includes an amplification ratio of the signal in the signal processing circuit.

(18) The power control method according to (12) or (13), in which the interval is controlled in accordance with a signal level of the signal read out at the first timing.

(19) The power control method according to (12) or (13), in which the interval is controlled in accordance with a current consumption of the imaging element.

(20) The power control method according to (12) or (13), in which the interval is controlled in accordance with a voltage input into the imaging element from the power supply.

(21) The power control method according to (12) or (13), in which the interval is controlled in accordance with electrostatic capacitance included in the power supply.

(22) The power control method according to (12) or (13), in which the interval is controlled in accordance with a voltage supplied to the power supply.

(23) A power control program for controlling a power supply supplying power to an imaging element including a pixel array that includes a plurality of pixels which are two-dimensionally arranged, a drive circuit of the pixel array, and a signal processing circuit that processes a signal read out from the pixel array by driving of the drive circuit, the power control program causing a processor to execute a step of stopping the supply of power to a part of circuits of the imaging element from the power supply at a first timing after completion of the readout of the signal, resuming the supply of power to the part of the circuits at a third timing before a second timing that is a start timing of the readout of the signal from the pixel array performed after the first timing, and variably controlling an interval between the second timing and the third timing.

While various embodiments are described above with reference to the drawings, the present invention is not limited to such examples. It is apparent that those skilled in the art may perceive various modification examples or correction examples within the scope disclosed in the claims, and those examples are also understood as falling within the technical scope of the present invention. In addition, any combination of each constituent in the embodiment may be used without departing from the gist of the invention.

The present application is based on Japanese Patent Application (JP2020-151618) filed on Sep. 9, 2020, the content of which is incorporated in the present application by reference.

EXPLANATION OF REFERENCES

1: imaging apparatus
100: imaging unit
10: light receiving section
11: pixel
20: vertical scanning circuit
30: output processing circuit
40: horizontal scanning circuit
50: digital signal processing circuit
60: power supply control circuit
101: power supply circuit
102: battery
103: control unit
INT: interval
Ta: readout time period of pixel for phase difference detection
Tb: readout time period of pixel for imaging
200: smartphone
201: casing
202: display panel
203: operation panel
204: display and input unit
205: speaker 206: microphone
207: operation unit
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit
ST1 to STn: GNSS satellites

What is claimed is:

1. An imaging apparatus comprising:
an imaging element including a pixel array that includes a plurality of pixels which are two-dimensionally arranged, a drive circuit of the pixel array, and a signal processing circuit that processes a signal read out from the pixel array by driving of the drive circuit;
a power supply;
a power supply control circuit that controls electric power supplied to the imaging element from the power supply; and
a processor,
wherein the processor is configured to control the power supply control circuit to stop the supply of electric power to a part of circuits of the imaging element from the power supply at a first timing after completion of the readout of the signal, to resume the supply of electric power to the part of the circuits at a third timing before a second timing that is a start timing of the readout of the signal from the pixel array performed after the first timing, and to variably control an interval between the second timing and the third timing.

2. The imaging apparatus according to claim 1,
wherein the processor is configured to stop the supply of electric power to at least the signal processing circuit at the first timing.

3. The imaging apparatus according to claim 1,
wherein the drive circuit is capable of changing driving in units of frames, and
the processor is configured to control the interval in accordance with the driving of the drive circuit.

4. The imaging apparatus according to claim 1,
wherein the processor is configured to control the interval in accordance with an amplification ratio of the signal in the imaging element.

5. The imaging apparatus according to claim 4,
wherein the pixel array includes a converter that converts the signal which is an analog signal and output from the pixel into a digital signal, and
the amplification ratio includes an amplification ratio of the converter.

6. The imaging apparatus according to claim 4,
wherein the amplification ratio includes an amplification ratio of the signal in the signal processing circuit.

7. The imaging apparatus according to claim 1,
wherein the processor is configured to control the interval in accordance with a signal level of the signal read out at the first timing.

8. The imaging apparatus according to claim 1,
wherein the processor is configured to control the interval in accordance with a current consumption of the imaging element.

9. The imaging apparatus according to claim 1,
wherein the processor is configured to control the interval in accordance with a voltage input into the imaging element from the power supply.

10. The imaging apparatus according to claim 1,
wherein the processor is configured to control the interval in accordance with electrostatic capacitance included in the power supply.

11. The imaging apparatus according to claim 1,
wherein the processor is configured to control the interval in accordance with a voltage supplied to the power supply.

12. A power control method for controlling a power supply supplying electric power to an imaging element including a pixel array that includes a plurality of pixels which are two-dimensionally arranged, a drive circuit of the pixel array, and a signal processing circuit that processes a signal read out from the pixel array by driving of the drive circuit, the power control method comprising:
stopping the supply of electric power to a part of circuits of the imaging element from the power supply at a first timing after completion of the readout of the signal,
resuming the supply of electric power to the part of the circuits at a third timing before a second timing that is a start timing of the readout of the signal from the pixel array performed after the first timing, and
variably controlling an interval between the second timing and the third timing.

13. The power control method according to claim 12,
wherein the supply of electric power to at least the signal processing circuit is stopped at the first timing.

14. The power control method according to claim 12,
wherein the drive circuit is capable of changing driving in units of frames, and
the interval is controlled in accordance with the driving of the drive circuit.

15. The power control method according to claim 12,
wherein the interval is controlled in accordance with an amplification ratio of the signal in the imaging element.

16. The power control method according to claim 15,
wherein the pixel array includes a converter that converts the signal which is an analog signal and output from the pixel into a digital signal, and
the amplification ratio includes an amplification ratio of the converter.

17. The power control method according to claim 15,
wherein the amplification ratio includes an amplification ratio of the signal in the signal processing circuit.

18. The power control method according to claim 12,
wherein the interval is controlled in accordance with a signal level of the signal read out at the first timing.

19. The power control method according to claim 12,
wherein the interval is controlled in accordance with a current consumption of the imaging element.

20. A non-transitory computer readable medium storing a power control program for controlling a power supply supplying electric power to an imaging element including a pixel array that includes a plurality of pixels which are two-dimensionally arranged, a drive circuit of the pixel array, and a signal processing circuit that processes a signal read out from the pixel array by driving of the drive circuit, the power control program causing a processor to execute a process comprising:
stopping the supply of electric power to a part of circuits of the imaging element from the power supply at a first timing after completion of the readout of the signal;

resuming the supply of electric power to the part of the circuits at a third timing before a second timing that is a start timing of the readout of the signal from the pixel array performed after the first timing; and variably controlling an interval between the second timing and the third timing.

\* \* \* \* \*